May 30, 1950   G. P. V. GLOTON   2,509,635
REVOLVER HEAD FOR TOOL MACHINES
Filed May 23, 1945   2 Sheets-Sheet 1

INVENTOR
GASTON PIERRE VICTOR GLOTON
BY Campbell Brumbaugh + Free
ATTORNEYS

Patented May 30, 1950

2,509,635

UNITED STATES PATENT OFFICE 2,509,635

REVOLVER HEAD FOR TOOL MACHINES

Gaston Pierre Victor Gloton, Les Coteaux de Saint-Cloud, France, assignor to Etablissements Horstmann, Paris, France, a corporation of France Application May 23, 1945, Serial No. 595,404
In France December 9, 1943

Section 1, Public Law 690, August 8, 1946
Patent expires December 9, 1963

4 Claims. (Cl. 10—129)

This invention relates to turret heads for power tools and it relates particularly to turret heads capable of receiving a plurality of rotary tools such as, for example, drills, taps, reamers and the like, which can be brought into operating position successively.

In accordance with the invention, the turret head includes a multiple socket rotary element, each socket being provided with a tool driving shaft which may be coupled selectively to a main power shaft and driven in either direction without changing the direction of rotation of the main power shaft.

More particularly, the turret head includes a driving shaft which is so arranged as to drive a pair of clutch elements in opposite directions. Cooperating with the clutch elements is a clutch member which is arranged for axial as well as rotary movement to couple selectively with either of the clutch elements. The clutch member may be connected by means of a suitable transmission to any one of the power tool operating shafts mounted in the various sockets of the turret head by simply rotating the turret head into the position required for operation on a work piece.

A novel feature of the invention is the provision of a transmission whereby the tool may be driven in either direction. The transmission includes a connection between the tool driving shaft and the shiftable clutch member whereby, upon axial movement of the tool driving shaft, the clutch member may be shifted to selectively engage one of the clutch elements and thereby rotate the tool driving shaft in a forward or reverse direction.

Figure 1:
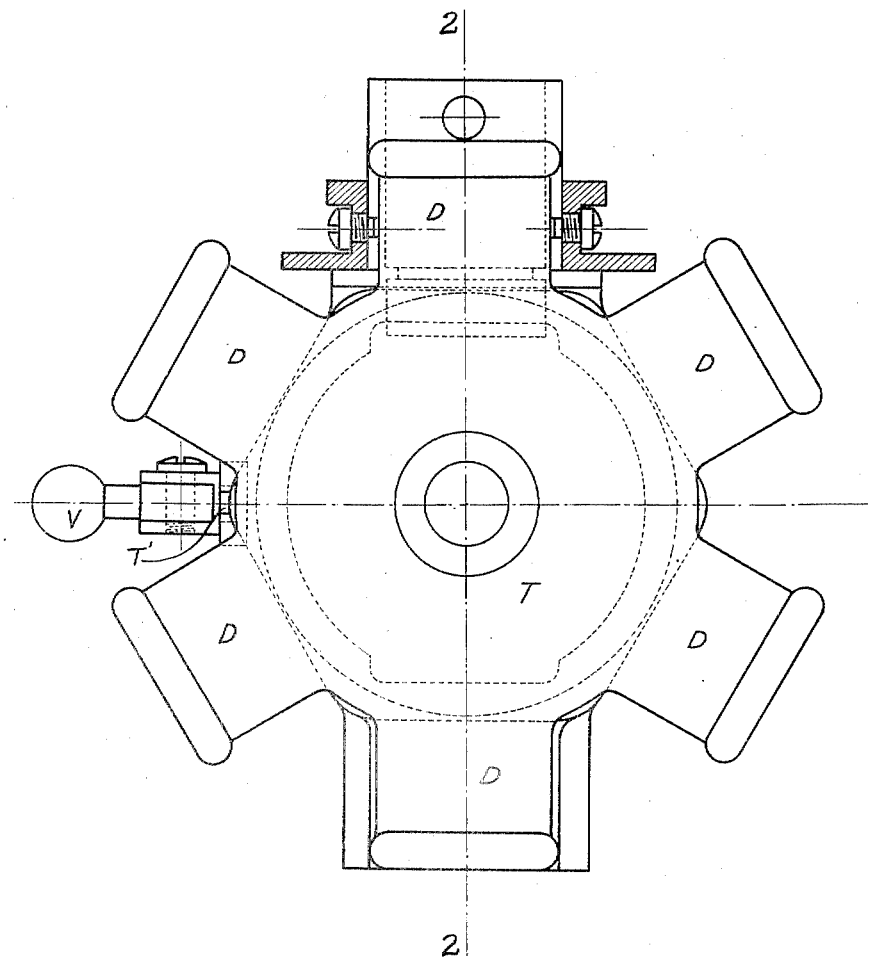
Figure 2:
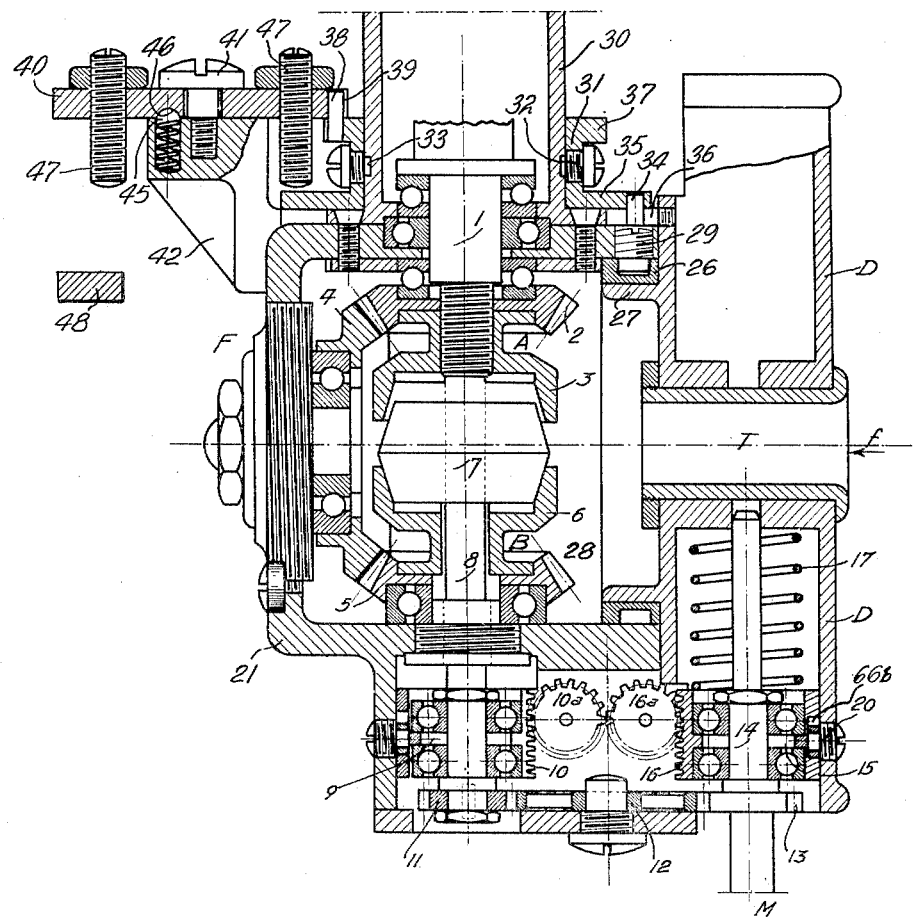

For a better understanding of the present invention, reference may be had to the accompanying drawings in which:

Figure 1 is a view in front elevation of one form of device embodying the present invention, and Figure 2 is a sectional view of the device taken on line 2—2 of Figure 1.

The form of the invention chosen for purposes of illustration may include a head member F which may be mounted, for example, on a lathe or drill press frame in a position suitable for bringing it into operative position with respect to the article being worked upon. Rotatively mounted on a sleeve shaft T, projecting from the head F is a turret head D which is, as illustrated in Figure 1, provided with six sockets.

Referring now to Figure 2, the turret head may include a drive shaft 1, which is driven in any suitable way and is provided at its inner end with a bevel gear 2 and a cone clutch element 3, which rotate with the shaft.

The bevel gear 2 meshes with an idle bevel gear 4 rotatively mounted in the head F. The gear 4 meshes with a bevel gear 5 mounted coaxially with the gear 2. The bevel gear 5 is fixed to a cone clutch element 6 so that these elements rotate together. Interposed between the clutch elements 3 and 6 is a double cone clutch element 7 that is carried by a shaft 8 co-axial with the drive shaft 1. The shafts 1 and 8, as well as the gears 2, 4, and 5, are supported on suitable anti-friction bearings.

The shaft 8 is axially movable, as well as rotatable, and is provided near its lower end with a pair of anti-friction bearings which support a rack member 10 from the shaft, allowing the shaft 8 to rotate relatively to the rack member 10 but causing the rack member 10 to move axially with the shaft 8. The lower end of the shaft 8 is provided with a gear 11 which is fixed to the shaft and rotates therewith. The gear 11 meshes with an idler gear 12 carried in the head member F.

Each of the sockets of the turret head D is provided with a gear 13 which is mounted on a shaft 14 that is capable of rotary movement and axial movement relative to the socket. The shaft 14 is journalled by means of suitable anti-friction bearings in a sleeve having a rack 16 thereon similar to the rack 10 described above. The shaft 14 is normally urged downwardly as viewed in Figure 1 by means of a spring 17 encircling the shaft and mounted in the base of the socket. A suitable chuck (not shown) may be mounted on each of the shafts 14.

The gear 13 is so arranged that it moves into mesh with the gear 12 when the turret D is turned so as to provide a positive power transmitting connection between the clutch member 7 and the shaft 14 when the shaft in a selected socket is in an operative position. The corresponding shafts in the other sockets are, of course, disconnected from the source of power and are not driven.

Movement of the shaft 14 is utilized to reverse the direction of rotation of the shaft 14. Thus, the racks 10 and 16 are interconnected by means of a pair of meshed gears 10a and 16a which cause the shafts 14 and 8 to move axially in the same direction. Therefore, when the shaft 14 is moved upwardly, the shaft 8 likewise moves upwardly, thereby engaging the clutch member 7 with the clutch element 3 and causing the shaft 14 to rotate in the same direction as the shaft 1. When the shaft 14 is moved downwardly, the shaft 8 likewise moves downwardly, thereby engaging the clutch member 7 with the clutch element 6 as illustrated in Figure 1 and causing the shaft 14 to rotate in a direction opposite to shaft 1.

Axial movement of the shaft 14 may be limited by means of the stop 20 which engages in an elongated slot 16b in the rack 16.

With the above-described device it is possible to equip each of the sockets of the turret head D with a different size tool or a different kind of tool so that the head may be rotated as desired to accomplish different types of work without the necessity of changing the tools and readjusting the turret head. The turret element D may be locked in any of its adjusted positions by means of a pivoted bolt V which engages any one of a series of six notches T' to lock the turret D in position, as shown in Figure 2. The clutch elements 3, 6 and 7 are mounted in a casing 21 of any suitable type which may be provided with mechanism for regulating the movement of the device as a whole to control the depth to which the tool enters the material being worked upon, for example, as during a tapping operation. To this end, the turret D is provided with a grooved annular ring 26 mounted on an annular flange 27, these elements being rotatable in the open end 28 of the casing 21. The turret assembly is retained against axial movement by means of threaded studs 29 extending into the ring 26.

The mounting sleeve 30, by means of which the device is supported on, for example, a drilling machine, is provided with a rotatable sleeve 31 which is retained in position by means of threaded studs 32 engaging in a groove 33 in the exterior of the sleeve 30 so that the sleeves 30 and 31 may be rotated relatively. Rotation of the sleeve 31 is accomplished by means of a series of pins 34 in the lower flange 35 of the sleeve 31, these pins being disposed in the paths of another series of pins 36 mounted on the turret D so that as the turret D is rotated, the sleeve 31 is also rotated about the sleeve 30.

The upper flange 37 of the sleeve 31 is also provided with a series of pins 38 which are engageable in corresponding notches 39 of a disc member 40 which is rotatably supported by means of a screw 41 on the bracket 42 projecting upwardly from the casing 21. The disc 40 therefore is rotated by the rotation of the sleeve 31 into positions corresponding to the positions of the sockets of the turret D. The disc 40 is held in any of six adjusted positions each corresponding to a different socket in position for use by means of a spring urged ball 45 which engages in the recesses 46 in the underside of the disc 40. The disc is also provided with a series of six threaded and adjustable screws 47 corresponding to the sockets in the turret D. These screws 47 may be adjusted axially to control the movement of the head as a whole. Thus, the pin 47 which is disposed outwardly of the casing 22 controls the movement of the head as a whole by engaging a limit block 48 mounted on the frame of the drilling machine to limit the downward movement of the head. By adjusting the screws 47 axially, the movement of the head can be effectively limited and the axial movement of each of the tools carried by the several sockets in the turret head D likewise precisely limited.

While the device has been illustrated as including six sockets in the turret head, it is possible to provide fewer or more sockets as may be desired. Accordingly, it will be understood that the device embodying the present invention is susceptible to considerable modification and therefore should be considered as illustrative of the invention and not as limiting the scope of the following claims.

What I claim is:

1. A turret head for a power tool comprising a head member, a turret member rotatively mounted on said head member and having a plurality of radially extending sockets, a pair of opposed clutch elements rotatably mounted in said head member, means connecting said clutch elements to rotate them in opposite directions, a clutch member between said clutch elements, a driven shaft fixed to said clutch member, said driven shaft being mounted for rotary movement and for axial movement in said head to engage said clutch member selectively with said clutch elements, a tool driving shaft mounted in each of said sockets for rotary and axial movements, disengageable driving means on said driving and driven shafts to selectively connect one of said tool driving shafts to said driven shaft, and additional elements connected to said driving and driven shafts and movable into and out of driving relation upon rotation of said turret said elements being movable with said driving and driven shafts to move said driven shaft axially in response to axial movement of said one shaft to disengage said clutch member from one of said clutch elements and engage said clutch member with the other of said clutch elements.

2. A turret head for a power tool comprising a head member, a turret member rotatably mounted on said head member and having a plurality of radially extending sockets, a pair of opposed clutch elements rotatably mounted in said head member, means connecting said clutch elements to rotate them in opposite directions, a clutch member between said clutch elements, a driven shaft fixed to said clutch member mounted for rotary movement and for axial movement in said head to engage said clutch member selectively with said clutch elements, a tool driving shaft mounted in each of said sockets for rotary and axial movements, disengageable elements on said driving and driven shafts movable therewith and also movable into and out of driving relation upon rotation of said turret to selectively connect one of said tool driving shafts to said driven shaft, rack elements movable axially with said driving and driven shafts and gearing interposed between said rack elements to move said driven shaft axially in response to axial movement of said one shaft to disengage said clutch member from one of said clutch elements and engage said clutch member with the other of said clutch elements.

3. A turret head for a power tool comprising a head member, a turret member rotatably mounted on said head member and having a plurality of radially extending sockets, a pair of opposed friction clutch elements rotatably mounted in said head member, means connecting said clutch elements to rotate them in opposite directions, a friction clutch member between said clutch elements, a driven shaft fixed to said clutch member mounted for rotary movement and for axial movement in said head to engage said clutch member selectively with said clutch elements, a tool driving shaft mounted in each of said sockets for rotary and axial movements, disengageable driving means interposed between and connecting selectively one of said tool driving shafts to said driven shaft and disengageable rack and gear means interposed between and connecting said one of said tool driving shafts to said driven shaft to move said driven shaft axially in response to axial movement of said one shaft to disengage said clutch member from one of said clutch elements and engage said clutch member with the other of said clutch elements.

4. A turret head for a power tool comprising a head member, a turret member rotatably mounted on said head member and having a plurality of radially extending sockets, a pair of opposed friction clutch elements rotatably mounted in said head member, means connecting said clutch elements to rotate them in opposite directions, a friction clutch member between said clutch elements, a driven shaft fixed to said clutch member mounted for rotary movement and for axial movement in said head to engage said clutch member selectively with said clutch elements, a tool driving shaft mounted in each of said sockets for rotary and axial movements, a gear member driven by said driven shaft, a gear on each tool driving shaft movable selectively into driving relation with said gear member upon rotation of said turret member, a first rack member connected to and movable axially with said driven shaft, another rack member movable axially with each tool driving shaft, gearing connected with said first rack member and engageable with said another rack member on a tool driving shaft that is in driving relation with said gear member, said rack members and gearing transmitting axial movement of a tool driving shaft in said driving relation to said clutch member to engage said clutch member with one of said clutch elements.

GASTON PIERRE VICTOR GLOTON.

REFERENCES CITED

The following references are of record in the file of this patent:

UNITED STATES PATENTS

| Number | Name | Date |
|---|---|---|
| 1,079,973 | Brozek | Dec. 2, 1913 |
| 2,303,565 | Luna | Dec. 1, 1942 |
| 2,348,362 | Ruppel | May 9, 1944 |
| 2,348,364 | Ruppel | May 9, 1944 |